(No Model.)
J. RIDGE.
SPRING TIRE FOR VEHICLE WHEELS.
No. 573,922. Patented Dec. 29, 1896.
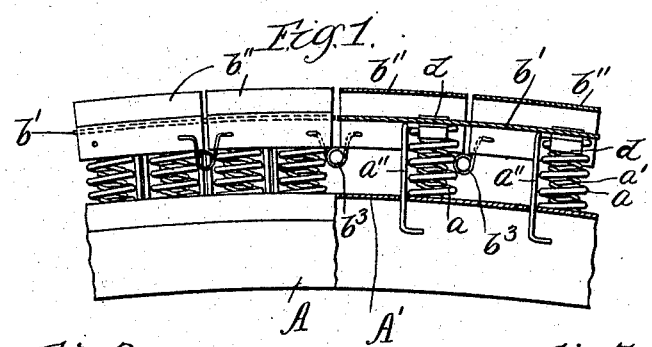
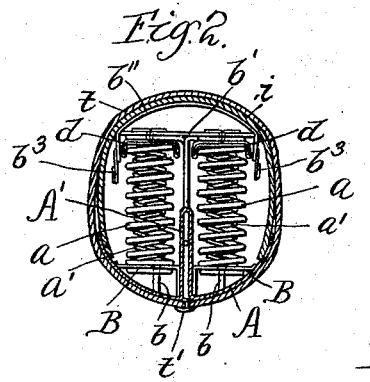
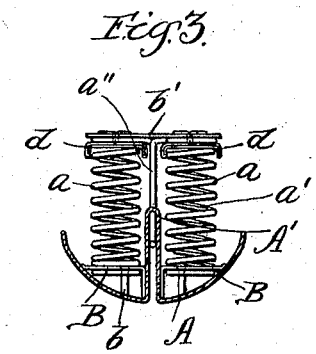
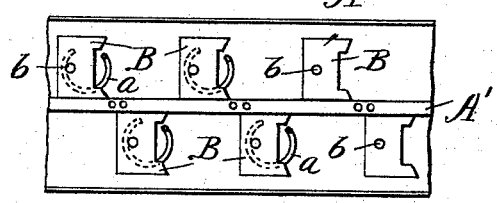
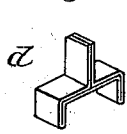
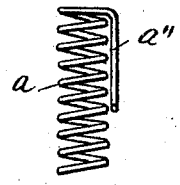
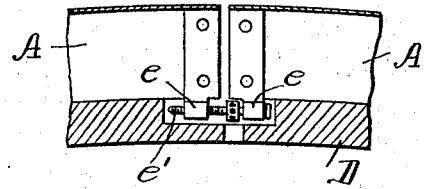
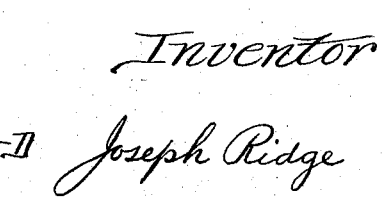
Witnesses.
Inventor
Joseph Ridge

UNITED STATES PATENT OFFICE.

JOSEPH RIDGE, OF CHICAGO, ILLINOIS.

SPRING-TIRE FOR VEHICLE-WHEELS.

SPECIFICATION forming part of Letters Patent No. 573,922, dated December 29, 1896.

Application filed October 31, 1896. Serial No. 610,773. (No model.)

*To all whom it may concern:*

Be it known that I, JOSEPH RIDGE, of Chicago, county of Cook, and State of Illinois, have invented new and useful Improvements in Spring-Tires for Vehicle-Wheels, of which the following is a full and complete description, reference being had to the accompanying drawings, which form a part of the specification.

In addition to greater perfection and efficiency in the formation and construction of parts that constitute the spring-tire structure a primary and important object is the production of a tire that forms an integral part of the wheel, that is, to construct the tire separately and not, as heretofore, attached permanently to the rim of the wheel, whereby the manufacture and sale of tires may be carried on independently of other parts of the vehicle.

My improvements embrace, as important advancements, means whereby the flexible and cushion structure is prevented from forceful impact of one metal part upon another; also, with others of importance, a feature is embodied whereby lateral action is restrained.

With reference to the accompanying drawings, which form a part of the specification, Figure 1 is a portion of the metallic part of the structure, partly in side elevation and partly in longitudinal vertical section centrally. Fig. 2 is a transverse vertical section of the completed tire. Fig. 3 is a transverse vertical section with portions of the structure omitted. Fig. 4 is a plan view of a portion of the metallic structure that constitutes the base or part to which the other portions are secured. Fig. 5 is a portion shown in longitudinal vertical section centrally embracing a portion of the wheel-rim. Fig. 6 is a transverse section centrally through Fig. 5. Fig. 7 shows one of the springs and an appended portion thereof. Fig. 8 is a detail view.

In reference to the several parts of the structure, A represents the lower band or base portion of the metallic structure, embracing a rib or raised central part A', made of a single piece of sheet metal. I preferably use a strip of metal of suitable width and having length sufficient to encircle the rim of a wheel, and by means of rollers form it into the shape in cross-section shown, and at the same time give it the curve corresponding to the wheel-rim. The latter is of the kind ordinarily constructed of wood, such as are in common use for other tires. As apparent, the band A is designed to rest in the concave or trough-like outer surface of the rim.

On the surface of band A and adjacent to rib A' are provided plates B, that serve as seats for the springs. These plates or seats B are respectively a single piece of sheet metal bent, as apparent, into shape to raise them above the surface of band A and perpendicular to the plane of the wheel, where they are secured, each by a rivet $b$, to band A, which rivet, in conjunction with the angular part of the plate resting against the rib, serves to securely fasten the part.

The springs $a$ are of helical formation and reinforced by inner concentric springs $a'$, the coils whereof are the reverse in direction of the coils of springs $a$. The springs are secured to the base or band A in a manner indicated in Figs. 2, 3, and 4, that is, an end coil of the spring is inserted under the plate B and made to engage with rivet $b$ by encircling the latter. The springs $a$ are arranged in double alinement, one on each side of rib A', and preferably alternate in their succession around the structure. The more substantial portion of the wheel-tread consists of a series of plates $b'$, succeeding each other in longitudinal direction. These plates $b'$ serve in substantially securing the outer ends of the springs with relation to each other and also with relation to double alinement. As a provision for securing the plates $b'$ and the springs the former are provided with slotted perforations.

To form secure connections between the springs and plates $b'$, a fastener $d$, formed of a doubled strip of metal, is provided. This is shown in Fig. 8 in shape for application, which is effected by introducing its lower or principal extensions into the end coils of the spring and by turning the fastener into a position where both extensions are firmly held by the coils. The doubled terminals of the fasteners are then within the circle of the coils and extend beyond suitable for insertion through the openings in plates $b'$, and when the latter are applied the ends of the fasteners are spread, as shown, to press tightly upon the plates.

The pendent part $a''$ of spring $a$, preferably as shown, is a continuation of the outer coil of said spring $a$ turned back parallel to the spring and of suitable length, as made apparent.

The plates $b'$ are plane, that flexion may readily take place. To obtain convexity that gives symmetry to the tire structure, and also to obtain cushioning action supplementary to that of the principal springs, I employ curved plates $b''$ of thin spring metal, the pendent sides whereof clasp the edges of plates $b'$, by which means they are held in position and at the same time permitted to flex by spreading or flattening against the plates that support them. The series of plates $b''$ throughout their circumferential extent are connected one with another by springs $b^3$, which serve to make a longitudinally elastic endless belt of this part of the tire structure.

The primary purpose of rib $A'$ is to arrest the action of the principal springs in the direction of compression and thereby prevent such impact of one coil upon another as might result in fracture. To this end the depth of the rib is such that plates $b'$ come in contact with it before the springs $a$ are completely depressed. Another object in providing the rib is that in construction of the band A rigidity is imparted by the central fold, thus permitting the use of metal lighter in weight than could otherwise be used. Another purpose is that in conjunction with the pendants $a''$ it serves to restrain undue lateral movements of the springs that might otherwise occur under heavy side pressure. As seen, the part $a''$ has its inward end inserted through an aperture in the top of the rib to occupy a position between the walls of the latter and is free to play back and forth in line with the spring. The end of part $a''$, as shown, is angular to prevent accidental withdrawal, being inserted by flexing the pendent part. It is evident that the pendent part $a''$ may be of suitable length to come in contact with the rim or band A before the coils of the springs are entirely closed, and thus assist rib $A'$, or in the omission of the latter prevent impact of coils.

As hereinbefore related, the band A is preferably made a continuous part sufficient in length to encircle the wheel-rim and rest in the concavity of the latter. Means of securing the tire to the rim and at the same time preserve the desirable feature of separableness of the two, before referred to, may be varied. A construction that provides for constriction of the tire is the means I employ in this example. The mechanism for this purpose is shown in Figs. 5 and 6. The part D in those figures represents a section of wood rim. An especially-adapted form of turnbuckle is used to bring the two ends of band A together, in which each end of the latter is provided with lugs $e$, secured to rib $A'$ by shanks extending into the space within the rib and secured by rivets, as apparent, one lug being screw-threaded and the other smooth in its aperture. A screw-bolt $e'$ is threaded at one end and smooth at the other serves in constriction or relaxation, whereby the tire may be readily drawn over the edge of the rim into place and tightened into firmness in its position. To permit manipulation of the screw $e'$ when in position on the rim, a central enlargement is provided having radial opening to permit the introduction of a pin or key. The bottom of the rim, as shown, is excavated for the accommodation of the screw and lugs and is suitably perforated through to give access to the screw enlargement from beneath the circle of the rim.

It is important that the peripheral portion of the tire structure should be circumferentially contractible, that fullness at the angles of the chord, caused by depression in riding and the consequent retardation, may be avoided. To this end the upper band is composed of sections $b'$, and the supplemental spring-plates $b''$ are joined by the elastic connections $b^3$. The extensible property of these peripheral parts also permits enlargement for convenience in mounting the tire upon the rim.

The view Fig. 3 shows an omission of parts that may be dispensed with and still retain efficiency in the tire. I, however, in this limitation supply a padding of elastic material (felt, for example) over and around the plates $b'$, and then an inclosing casing of elastic rubber over the whole tire structure. The pendants $a''$ may also be dispensed with; but with such omission the plates $b'$ should be flexibly joined one with another to maintain alinement, which the pendants $a''$, in addition to their other purposes, serve to do.

With the tire as shown in Fig. 2 the inner of the two outer encircling divisions $i$ represents a strip of shoe-elastic, which I find very efficient and serviceable and in connection with spring-plates $b''$ sufficiently softens the tread. The outer line $t$ represents a rubber casing having its edges laced together at $t'$.

Having thus fully described my invention, what I claim, and desire to secure by Letters Patent, is—

1. As a new article of manufacture, in a spring-tire, the combination of a base-band that will encircle the rim of a wheel concave in cross-section and adapted to rest in a hollow or trough-like rim, a series of outer arched flexible plates, a spring structure interposed between the said band and the said arched plates, a covering of elastic material, and readily-accessible means for constricting or removably securing the structure, thus formed, upon a wheel-rim, the whole constituting an annular cylindrical cushioning structure adapted to the purpose set forth.

2. In a tire for vehicles, the combination of a band in one or more parts, adapted to encircle a wheel-rim, a double alinement of springs secured at their inner portions to the band, a raised portion or rib connected with said band, that is intermediate of the spring-rows, and a tread portion or band that connects said springs at their outer ends.

3. In a spring-tire the combination of a band to encircle the rim of a wheel, a rib or central raised portion of, or on said band, a series of radially-arranged helical springs and extensions joined with said springs that are so connected with the rib or raised part of the band as to permit of spring compression and at the same time restrain "rolling" or undue lateral flexion of the spring structure.

4. In a spring-tire, the combination of a lower band to encircle the rim of a wheel, a series of springs mounted upon and surrounding said band and joined one to another at their outer ends, and a series of arched flexible plates mounted upon said springs.

5. In a tire for vehicles, in combination with an inner or supporting band, a metallic spring structure, an outer band structure perforated, metallic fasteners adapted to be entered into the spring-coils, and a portion of said fasteners suited for insertion through the perforations aforesaid and bent down to secure the parts of the structure substantially as shown and set forth.

6. In a tire, the combination with a lower or base band, and a series of helical springs, of a series of arched transverse plates that are flexibly joined one with another to form a circumferentially extensible and contractible band.

7. In a tire, the combination of a concave inner band, a central rib, plates on either side of said rib as seats for springs, and a series of radially-arranged helical springs in double alinement.

JOSEPH RIDGE.

Witnesses:
PORTER B. FITZGERALD,
S. B. OLSON.